United States Patent
Eady et al.

(10) Patent No.: US 6,304,788 B1
(45) Date of Patent: *Oct. 16, 2001

(54) METHOD AND APPARATUS FOR CONTROLLING MEDICAL MONITORING DEVICES OVER THE INTERNET

(75) Inventors: Robert Eady, Ottawa (CA); Brian Shuster, Beverly Hills, CA (US)

(73) Assignee: United Internet Technologies, Inc., Los Angeles, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/373,136

(22) Filed: Aug. 12, 1999

(51) Int. Cl.[7] .................................................. G05B 15/00
(52) U.S. Cl. .................. 700/86; 700/17; 700/83; 700/52; 700/53; 700/65; 709/205; 709/230; 709/246; 600/300; 600/509; 600/523; 340/870.07; 340/870.11
(58) Field of Search ................. 700/86, 83, 87, 700/17, 45–50, 52, 53, 65; 709/205, 230, 240–244, 246–250; 600/300–301, 509, 595, 483, 523; 340/870.07, 870.08, 870.09, 870.11

(56) References Cited

U.S. PATENT DOCUMENTS

| 4,216,462 | * | 8/1980 | McGrath et al. ..................... 340/150 |
| 5,410,471 | * | 4/1995 | Alyfuku et al. ......................... 700/86 |
| 5,748,103 | * | 5/1998 | Flach et al. ..................... 340/870.07 |
| 5,767,791 | * | 6/1998 | Stoop et al. ..................... 340/870.11 |
| 5,987,519 | * | 11/1999 | Peifer et al. .......................... 709/230 |

* cited by examiner

Primary Examiner—William Grant
Assistant Examiner—Ramesh Patel
(74) Attorney, Agent, or Firm—Blakely Sokoloff Taylor & Zafman

(57) ABSTRACT

An article including a computer readable medium having instructions stored thereon, which when executed, causes receipt of a control request for a medical-monitoring device located on a client and determining if the control request is serviceable by the medical-monitoring device. In addition, the instructions also include sending the control request unaltered to the client if the control request is serviceable by the medical-monitoring device, and modifying the control request to a serviceable control request if the control request is not serviceable by the medical-monitoring device.

3 Claims, 3 Drawing Sheets

METHOD AND APPARATUS FOR CONTROLLING MEDICAL MONITORING DEVICES OVER THE INTERNET

FIELD OF THE INVENTION

This invention relates to the control of medical devices over a network. Specifically, this invention describes a method and apparatus for controlling medical monitoring devices over the Internet.

DESCRIPTION OF RELATED ART

There are currently many ongoing efforts to provide health information to users of the Internet. Much of the recent efforts have been devoted to establishing online medical clinics where people can communicate with doctors directly. At this point, other than receiving a list of symptoms from the end user, these services have no way of knowing the end user's actual physical condition.

Accordingly, there is a need for a method and apparatus for controlling and receiving information from medical monitoring devices over the Internet. Specifically, it would be desirable to have a device that may allow physicians to receive vital information such as blood pressure and pulse via the Internet through the use of a device connected to their home computer.

SUMMARY OF THE INVENTION

What is disclosed is an article including a computer readable medium having instructions stored thereon, which when executed, causes receipt of a control request for a medical-monitoring device located on a client and determining if the control request is serviceable by the medical-monitoring device. In addition, the instructions also include sending the control request unaltered to the client if the control request is serviceable by the medical-monitoring device, and modifying the control request to a serviceable control request if the control request is not serviceable by the medical-monitoring device.

DETAILED DESCRIPTION

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), and the like. In addition, a "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

System Overview

A description of an exemplary system, which incorporates embodiments of the present invention, is hereinafter described.

The present invention relates to a method and apparatus for controlling medical-monitoring devices over a network.

Figure 1:
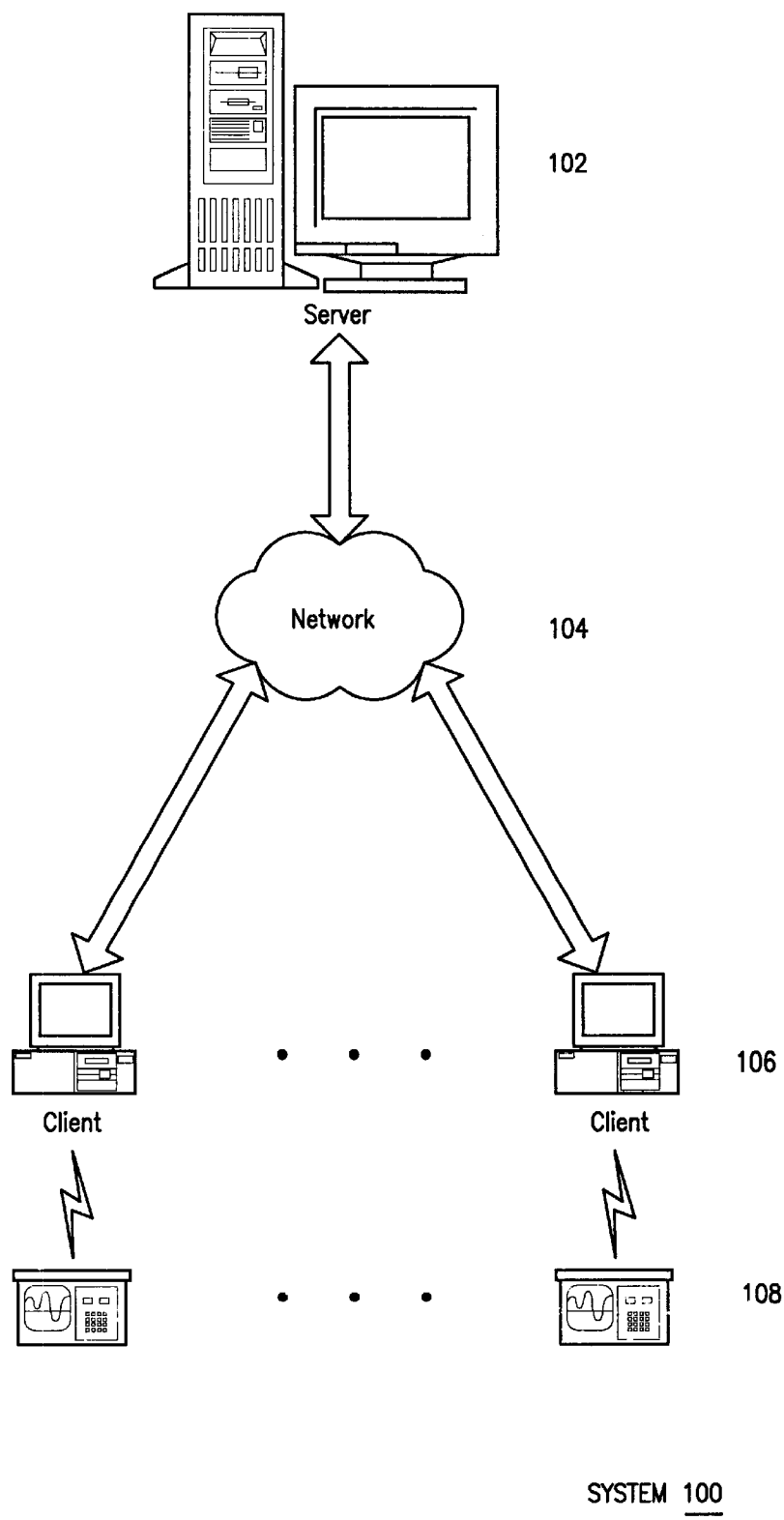
FIG. 1 is a system block diagram of one embodiment of a system in which the apparatus and method of the invention is used.

FIG. 1 illustrates a system 100 configured in accordance with one embodiment of the present invention, containing a server 102, a network 104, and a set of clients 106 with a set of medical monitoring devices 108 connected to set of clients 106.

As further described below, server 102 includes various hardware components. This includes a processor, memory, and one or more network interface cards. In addition, server 102 may also include a variety of other hardware devices, including, but not limited to, storage devices (including floppy disk drives, hard disk drives, and optical disk drives), input devices (including a mouse or keyboard), and output devices (including displays and printers).

Each of the computer systems in set of clients 106 may include a variety of hardware components that are similar to server 102. In addition, each computer system may also be equipped with a data port for connection of one or more medical-monitoring and other devices. In one embodiment, these include communications ports such as serial ports, which conform to the Institute of Electrical and Electronics Engineers (IEEE) RS-232 standard, IEEE-1284 parallel port standard, universal serial port (USB), or infra-red (IR) port for connection to set of medical-monitoring devices 108.

Network 104 is a network that operates with a variety of communications protocols to allow client-to-client and client-to-server communications. In one embodiment, network 104 is a network such as the Internet, implementing transfer control protocol/internet protocol (TCP/IP).

Set of medical monitoring devices 108 can be made of various components that have been calibrated and are capable of providing accurate date on various vital signs. It is controlled through the use of a respective computer in set of computer system 106 to which it is connected.

Figure 2:
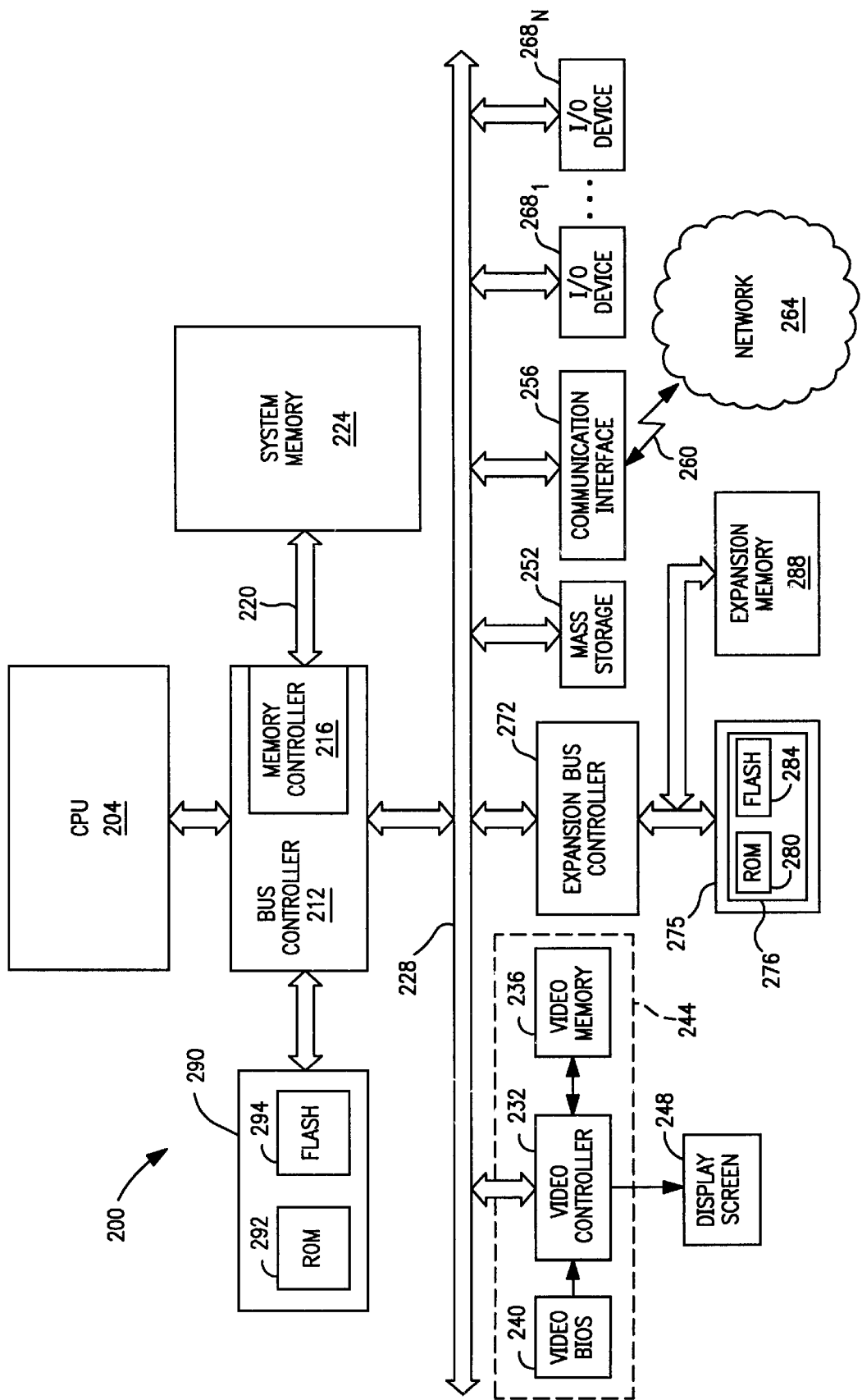
FIG. 2 illustrates an exemplary processor system or user computer system that may implement embodiments of the present invention.

FIG. 2 illustrates an exemplary computer system 200 that implements embodiments of the present invention. The computer system 200 illustrates one embodiment of server 102 and set of clients 106 (FIG. 1), although other embodiments may be readily used.

Referring to FIG. 2, the computer system 200 comprises a processor or a central processing unit (CPU) 204. The illustrated CPU 204 includes an Arithmetic Logic Unit (ALU) for performing computations, a collection of registers for temporary storage of data and instructions, and a control unit for controlling operation for the system 200. In one embodiment, the CPU 204 includes any one of the x86, Pentium™, Pentium II™, and Pentium Pro™ microprocessors as marketed by Intel™ Corporation, the K-6 microprocessor as marketed by AMD™, or the 6×86MX microprocessor as marketed by Cyrix™ Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 204. The CPU 204 is not limited to microprocessor but may take on other forms such as microcontrollers, digital signal processors, reduced instruction set computers (RISC), application specific integrated circuits, and the like. Although shown with one CPU 204, computer system 200 may alternatively include multiple processing units.

The CPU 204 is coupled to a bus controller 212 by way of a CPU bus 208. The bus controller 212 includes a memory controller 216 integrated therein, though the memory controller 216 may be external to the bus controller 212. The memory controller 216 provides an interface for access by the CPU 204 or other devices to system memory 224 via memory bus 220. In one embodiment, the system memory 224 includes synchronous dynamic random access memory (SDRAM). System memory 224 may optionally include any additional or alternative high speed memory device or memory circuitry. The bus controller 212 is coupled to a system bus 228 that may be a peripheral component interconnect (PCI) bus, Industry Standard Architecture (ISA) bus, etc. Coupled to the system bus 228 are a graphics controller, a graphics engine or a video controller 232, a mass storage device 252, a communication interface device 256, one or more input/output (I/O) devices $268_1$–$268_N$, and an expansion bus controller 272. The video controller 232 is coupled to a video memory 236 (e.g., 8 Megabytes) and video BIOS 240, all of which may be integrated onto a single card or device, as designated by numeral 244. The video memory 236 is used to contain display data for displaying information on the display screen 248, and the video BIOS 240 includes code and video services for controlling the video controller 232. In another embodiment, the video controller 232 is coupled to the CPU 204 through an Advanced Graphics Port (AGP) bus.

The mass storage device 252 includes (but is not limited to) a hard disk, floppy disk, CD-ROM, DVD-ROM, tape, high density floppy, high capacity removable media, low capacity removable media, solid state memory device, and combinations thereof. The communication interface device 256 includes a network card, a modem interface, or a similar communications device for accessing network 264 via communications link 260. In addition, communications interface device 256 includes communication ports such as serial ports (e.g., IEEE RS-232), parallel ports (e.g., IEEE-1284), Universal Serial Bus (USB) ports, and infra-red (IR) ports.

The I/O devices 268–$268_N$ include a keyboard, mouse, audio/sound card, printer, and the like. The expansion bus controller 272 is coupled to nonvolatile memory 275, which includes system firmware 276. The system firmware 276 includes system BIOS 82, which is for controlling, among other things, hardware devices in the computer system 200. The system firmware 276 also includes ROM 280 and flash (or EEPROM) 284. The expansion bus controller 272 is also coupled to expansion memory 288 having RAM, ROM, and/or flash memory (not shown). The system 200 may additionally include a memory module 290 that is coupled to the bus controller 212. In one embodiment, the memory module 290 comprises a ROM 292 and flash (or EEPROM) 294.

As is familiar to those skilled in the art, the computer system 200 further includes an operating system (OS) and at least one application program, which in one embodiment, are loaded into system memory 224 from mass storage device 252 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs which control the computer system's operation and the allocation of resources. The application program is a set of one or more software programs that perform a task desired by the user.

In accordance with the practices of persons skilled in the art of computer programming, the present invention is described below with reference to symbolic representations of operations that are performed by computer system 200, unless indicated otherwise. Such operations are sometimes referred to as being computer-executed. It will be appreciated that operations that are symbolically represented include the manipulation by CPU 204 of electrical signals representing data bits and the maintenance of data bits at memory locations in system memory 224, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 3:
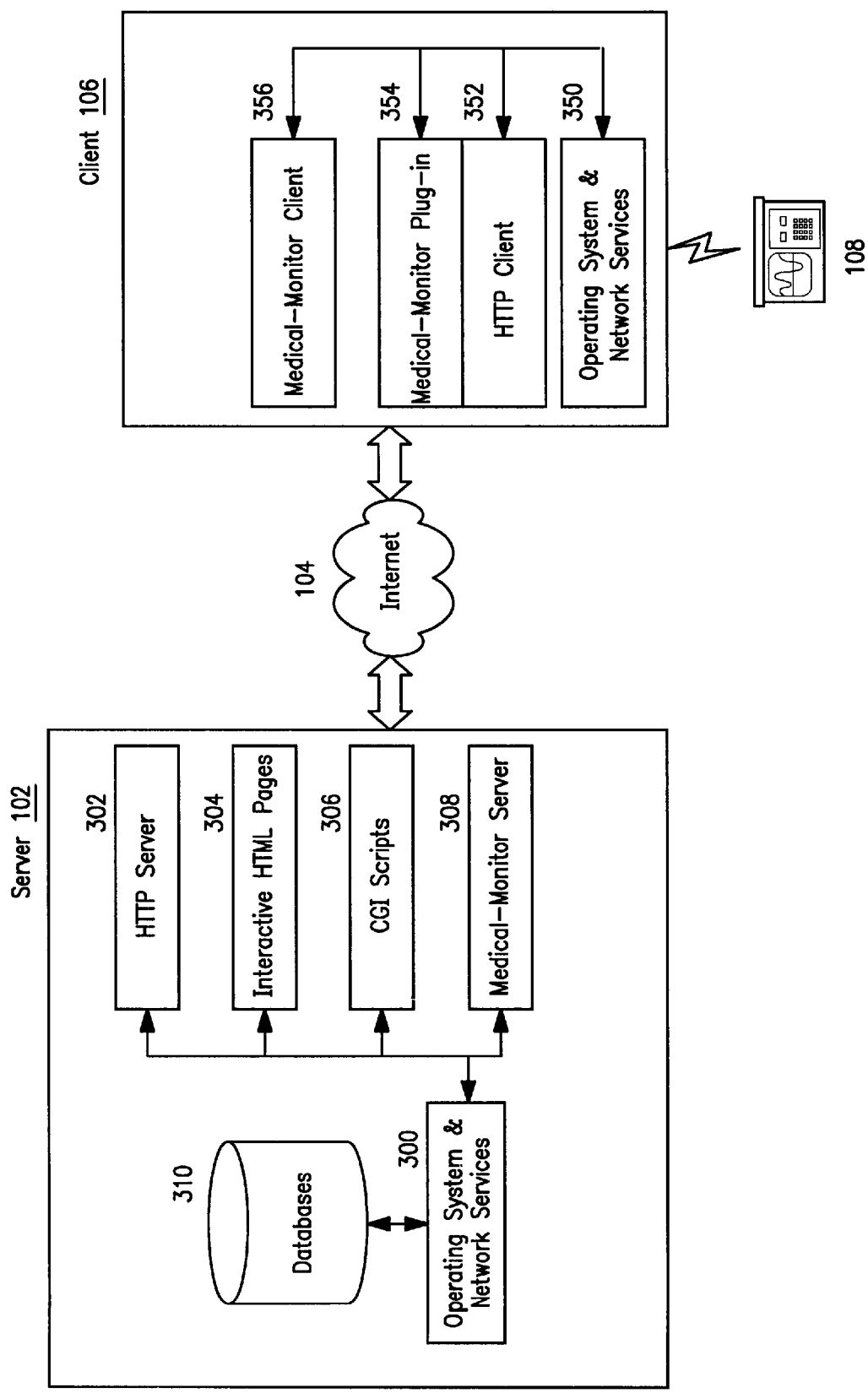
FIG. 3 illustrates a block diagram detailing portions of one embodiment of the server of FIG. 1 configured in accordance with one embodiment of the present invention.

FIG. 3 is a functional block diagram of server 102, including an operating system 300, an http server 302, a set of interactive hypertext mark-up language (HTML) 304, a set of common gateway interface (CGI) 306, a medical-monitor server 308, and a database 310. In one embodiment, operating system 300 provides network services for such network protocols as TCP/IP. FIG. 3 also contains a functional block diagram of client 106, which contains an operating system 350, including network drivers for such networks such as TCP/IP), an HTTP client 352, an medical-monitor client 356, and an medical-monitor plug-in 354.

Server 102 provides the following capabilities:

Basic network communication with multiple remote clients (e.g. set of clients 106) simultaneously.

Performing authentication and authorization of individual clients to communicate with medical monitoring server 308 on server 102.

Servicing HTTP requests from clients (e.g., set of clients 106) on the World Wide Web and communicating with medical monitor client browser plug-ins (e.g., medical-monitor plug-in 354).

HTTP server 302 is server software such as the product marketed under the name of Netscape Enterprise Server by Netscape Corporation, or the product marketed under the name of Internet Information Server by Microsoft Corporation. HTTP server 302 is capable of communicating with HTTP web clients via the HTTP protocol. In this capacity, HTTP server 302 is able to serve web clients with data (HTML, application output data, etc.).

Medical-monitor server 308 communicates with medical-monitor clients (e.g., medical-monitor client 356) to configure the medical-monitoring devices and retrieve any information necessary from the device. When medical-monitor server 308 is initiated, it takes control of a TCP/IP service port and listens for incoming connections from various clients over a network such as network 104. When medical-monitor server 308 sees an incoming connection, it then attempts to confirm the validity of the client and the data that is being sent to medical-monitor server 308. Once this has been established, medical-monitor server 308 may then start a bi-directional conversation using a custom language that both the server and the client understand.

Medical-monitor server 308 provides the following capabilities:

Provide information on medical-monitoring devices (e.g., set of medical-monitoring devices 108) with which it is able to communicate.

Act as a gatekeeper between client applications (e.g., between client applications running on set of clients 106), thereby controlling access to the medical-monitoring devices.

Understand and provide control of medical-monitoring devices no matter how sophisticated the device. For example, if a user were to attempt to control the intervals at which the device takes pulses, and that device did not have a controllable period for taking pulses—medical-monitor server 308 may identify this and return what parameters were actually controllable on the device. Medical-monitor server 308 may also be configured to alter control requests to allow the request to be serviced. For example, if the medical-monitor device from the example above has a controllable period for reporting to the server to retrieve instructions, the command may be altered to change the period of reporting, thereby allowing the server to be set to request a pulse to be taken every time the device reports.

Communicate with scripts/plug-ins that allow a web-server such as HTTP server 302 to access medical-monitor server 308, thereby allowing multiple users to access it through a web-client without having to install or use an medical-monitor client (e.g., patients without a medical-monitoring device compatible with the system may still manually provide their own information).

Set of CGI scripts 306 enable HTTP server 302 to communicate with medical-monitor server 308, thereby allowing a web developer to create web content capable of accessing various medical-monitoring devices on via a standard HTTP client. In the simplest form, set of CGI scripts 306 allows server 102 to request a list of active medical-monitor clients accessing the server and whether they are currently communicating and/or available for access via server 102.

Database 310 contains data of various types and that, when combined, forms content that is served to users via the server 102. Database 310, in one embodiment, is actually a collection databases containing information that may be accessed through a standard such as open database connectivity (ODBC) standard, as promoted by Microsoft Corporation. Information that may be contained in database 310 includes a listing of all medical-monitoring devices and respective clients to which they are connnected, the capabilities of the medical-monitoring devices (e.g., what functions the medical-monitoring devices have) and their status (e.g., whether they are currently accessible or not), and any information for any users that correspond to a particular medical-monitoring device.

The functionality provided by HTTP server 302 and medical-monitor server 308 may be implemented over several computers. In addition, the services and data provided by database 310 may also be implemented on one or more servers. Using multiple servers provides scalability for both the applications using the data (e.g., the various servers-other than the database server), and the applications providing the data (e.g., the database servers).

Referring to FIG. 3, client 106 is capable of performing the following functions:

Basic network communication with server 102.

Control of medical-monitoring devices (e.g., medical-monitoring device 108) connected to itself via an interface port and the processing of command sequences sent to it from server 102 (e.g., medical-monitor server 308) before converting this data into commands that it sends to the connected medical-monitoring device.

Medical-monitor client 356 provides control for medical-monitoring devices (e.g., medical-monitoring device 108) and also interfaces with both medical-monitor plug-in 354 and medical-monitor server 308. Medical-monitor client 356 may be supplemented by software drivers for communications with any medical-monitoring devices.

HTTP client 352 is a software program that works with HTTP, and is also known as a "browser" application. Similar products include the product marketed by Netscape Corporation under the name Netscape Navigator or the product marketed by Microsoft Corporation under the name Internet Explorer. Medical-monitor plug-in 354 is a plug-in application that is specifically written to interface with HTTP client 352 to provide an interface to medical-monitor client 356.

Although the present invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. An article comprising a computer readable medium having instructions stored thereon, which when executed, causes:

receiving of a control request from a first client over a network for a medical-monitor device located on a second client;

determining if the control request is serviceable by the medical-monitor device;

sending the control request unaltered to the second client over the network if the control request is serviceable by the medical-monitor device, and modifying the control request to a serviceable control request if the control request is not serviceable by the medical-monitor device before sending it to the second client.

2. A method for remotely controlling a medical-monitoring device comprising the steps of:

a) taking control of a port remote from said medical-monitoring device;

b) determining whether data received by the port is intended for a medical-monitoring device;

c) if said received data is intended for a medical-monitoring device, sending signals for controlling said medical-monitoring device based upon said received data, wherein said signals are modified, if necessary to control said medical monitoring device before sending to said medical-monitoring device.

3. A method for remotely controlling a medical-monitoring device comprising the steps of:

a) communicating with a server;

b) sending medical-monitoring device control signals to said server wherein if said medical-monitoring device control signals correspond to an activity which said medical-monitoring device control is incapable of performing, modifying said control signals to correspond to an activity which said medical-monitoring device control is capable of performing before sending to said medical medical-monitoring device;

c) receiving medical-monitoring device control signals from said server;

d) converting said medical-monitoring device control signals to commands for sending to a medical-monitoring device.

* * * * *